Patented Oct. 9, 1951

2,571,049

UNITED STATES PATENT OFFICE 2,571,049

PNEUMATIC COUNTERWEIGHT

Milton J. Meylich, West Orange, N. J., assignor to Western Electric Company, Incorporated, New York, N. Y., a corporation of New York Application November 9, 1946, Serial No. 709,039

1 Claim. (Cl. 90—15)

This invention relates to pneumatic counterweights, and more particularly to variable pneumatic mechanisms for counter-weighing machine parts movable into and out of operating positions.

Standard hand operated milling machines employ operating units for the milling cutters which include spindles for the cutters and speed reducing driving mechanisms. In such milling machines, the conventional counterweights have been employed to counterweigh the unit and its spindle only. The milling cutters to be mounted on the spindles of such units may weigh from twenty-five to one-hundred fifty pounds and when this extra weight is added to the operating unit of the milling machine, extra effort is required by the operator to move the unit away from the work.

An object of the invention is to provide a pneumatic counterweight which is simple in structure and highly efficient in operation to maintain a constant force to counterweigh a movable object, the constant force being variable with variations in the weight of the unit.

With this and other objects in view, the invention comprises a pneumatic counterweight for a movable object variable in weight to be counterweighed comprising an air cylinder having a piston operatively connected to the movable object, a supply line for air under a given high pressure connected to a feed line leading to the air cylinder, and a control unit disposed in the feed line variable with variations in the weight of the movable object to maintain the air in the feed line to the air cylinder at a selected constant pressure to counterweigh the movable object.

In the present embodiment of the invention, the movable object to be counterweighed is the tool driving unit of a milling machine, the weight of which is increased depending upon the weight of the tool or cutter mounted upon the driving spindle. A gage is disposed in the feed line between the control unit and the air cylinder, actuable by the air under pressure in the feed line and calibrated in terms of the counterweighing thrust. As an example, if the weight of the cutter added to the driving unit of the machine is fifty pounds, the control valve or unit in the feed line is adjusted to maintain a sufficient pressure in the feed line to the air cylinder, this pressure being determined during the adjustment of the control unit by observing the gage, to maintain a fifty pound thrust against the unit.

Figure 1:
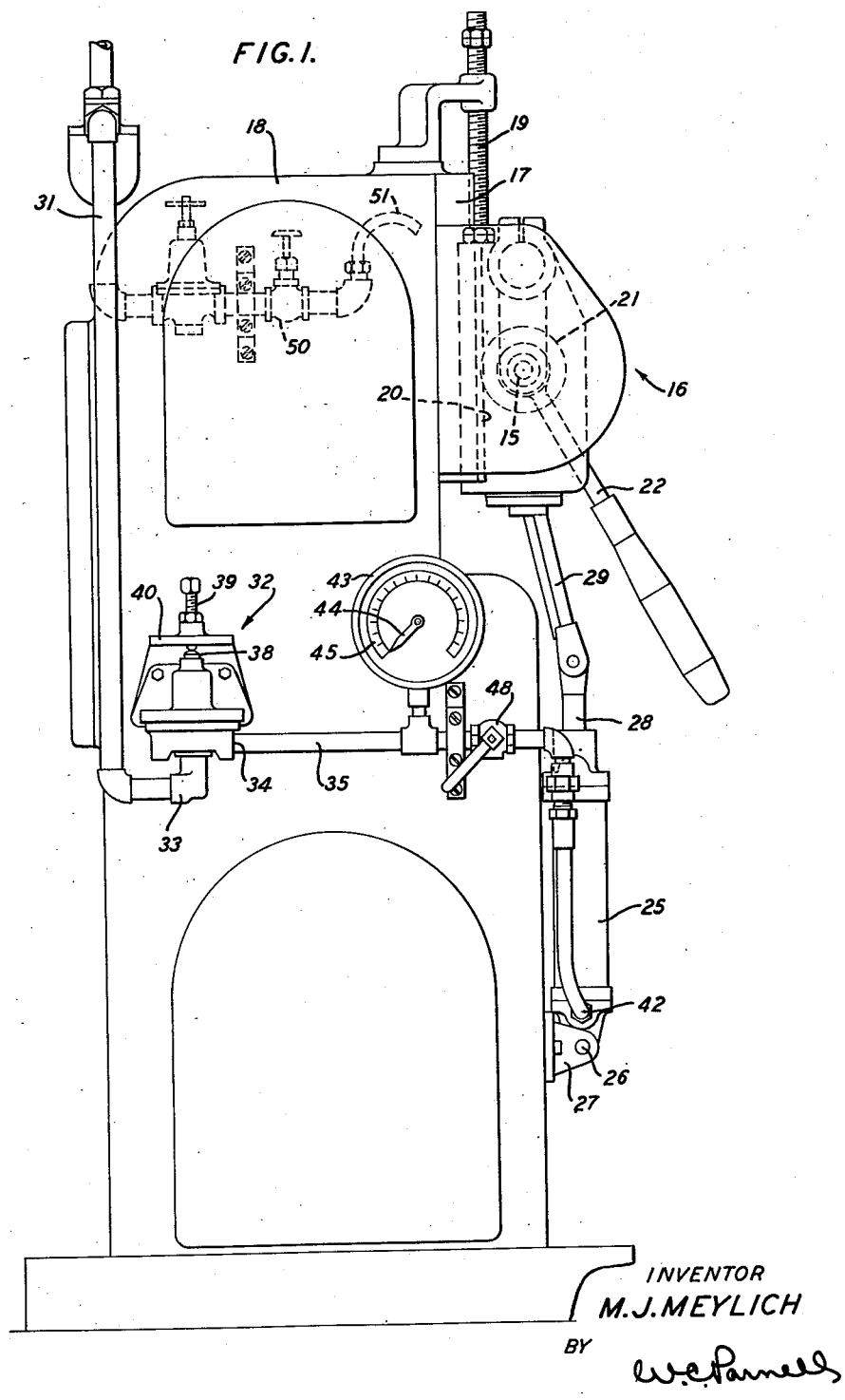
Figure 2:
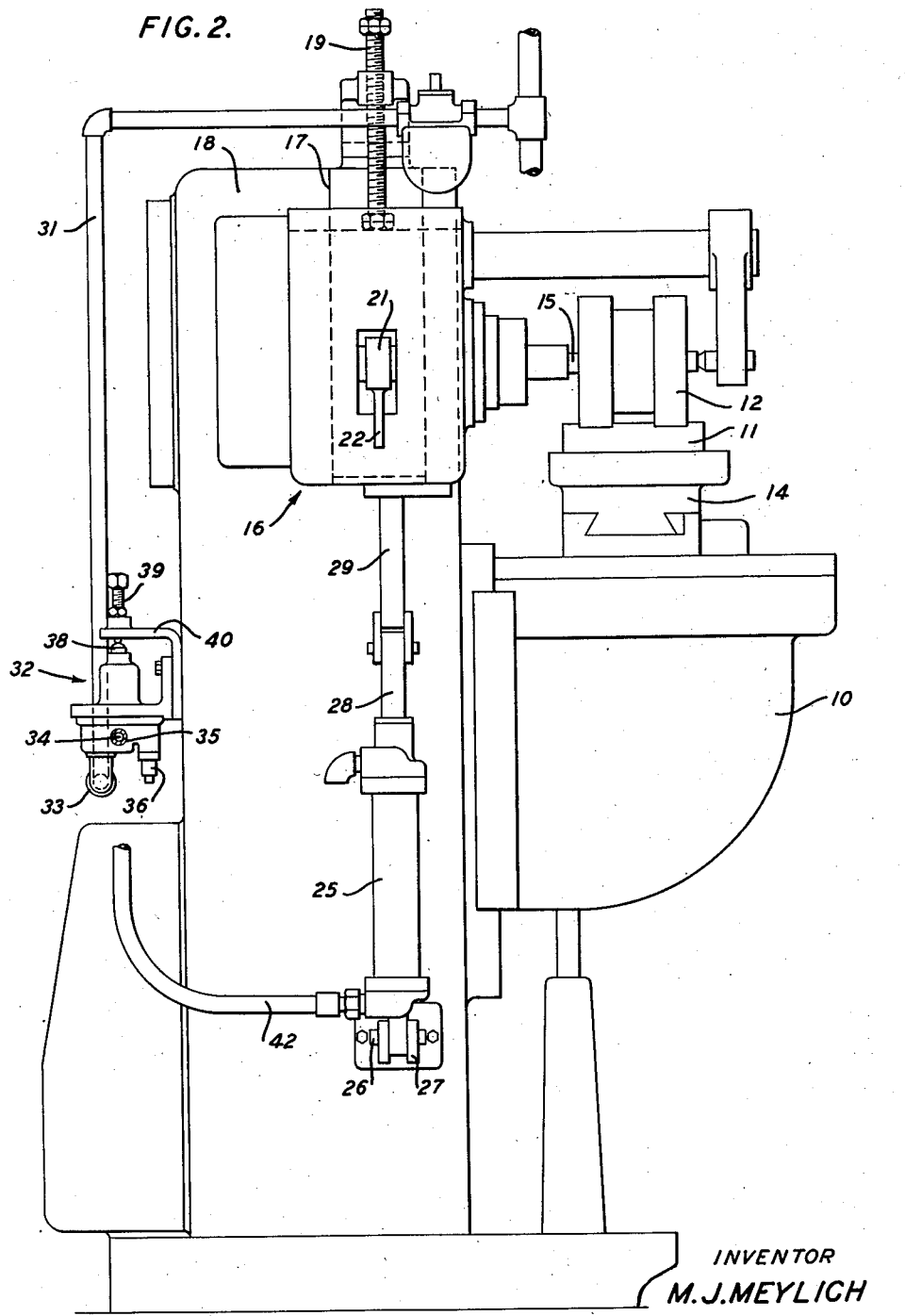

Other objects and advantages will be apparent from the following detailed description when considered in conjunction with the accompanying drawings, wherein Fig. 1 is a side elevational view of a milling machine embodying the invention; and Fig. 2 is a front elevational view of the structure shown in Fig. 1.

Referring now to the drawings, the machine employed to illustrate the invention includes a work support 10 adjustable vertically relative to the work position depending upon the thickness of the material 11; the depth of the cut or cuts to be made therein by a selected cutter or tool 12 and the diameter of the cutter. In machines of this type, mechanism is usually employed to move a carriage 14 upon which the work 11 is mounted in a given path relative to the cutter 12. The cutter 12 is mounted upon a driving spindle 15 which is a part of a driving unit or mechanism 16 including gears to reduce the speed from the speed of the initial driving means or motor (not shown) to the desired speed of rotation for the spindle and cutter. The unit 16 is supported for vertical movement on a guide 17 which is a part of the main frame 18 of the machine. An adjustable stop 19 limits the vertical movement of the unit 16. A rack 20 and a pinion 21 under the control of a hand lever 22 constitute the means to move the unit 16 relative to its operating position shown in Fig. 2. Furthermore, the conventional counterweighing means (not shown) may be connected to the unit 16 to assist in its movement vertically from its operating position. This counterweighing mechanism which may be a part of the machine does not compensate for the variable weights added to the unit 16 by the mounting of the cutters 12 thereon. These cutters, which may weigh from twenty-five to one-hundred fifty pounds, increase the effort required by the operator to raise the unit 16 and its cutter away from the work. The efficiency of an operator depends greatly upon the energy required to operate the machine. By counterbalancing the unit 16 with its cutter regardless of the additional weight the cutter adds to the unit, the element of fatigue is reduced to a minimum.

The pneumatic counterweight in the present embodiment includes an air cylinder 25 pivotally supported at 26 adjacent its lower end to a bracket 27 mounted upon the frame of the machine. The air cylinder includes a piston (not shown) fixedly mounted upon the lower end of a piston rod 28, the upper end of the rod being connected by the aid of a link 29 to the unit 16.

A supply line 31, for air under a given high pressure greater than that required at any time for the mechanism, leads to a control unit 32.

The control unit 32 is a commercially known brake valve having an inlet 33 connected to the supply line, an outlet 34 connected to a feed line 35 and an exhaust valve portion 36 operable to open an inner portion of the valve communicating with the feed line 35 to the atmosphere when the pressure in the feed line exceeds a selected pressure for which the unit or valve 32 has been set. The control unit 32 includes a plunger 38 operable against the force of an internal spring to control an inner mechanism to admit air to the feed line 35 from the supply line 31 under a reduced selected constant pressure. An adjustable screw 39 positioned in a threaded portion of a bracket 40, mounted on the housing or frame of the machine and serving as a support for the valve or unit 32, is movable to adjust the position of the plunger 38 to set the control unit or valve 32 at any selected position whereby it will maintain a selected constant pressure of the air in the fluid line 35. The control unit 32 may be of a well known type commonly used as a brake valve and in which the plunger 38 is actuated by a lever connected to, and operated by a brake pedal to apply selected constant pressure to braking units. In the present embodiment, the function of the valve 32 is to maintain a selected constant air pressure in the feed line 35 which leads to the bottom of the air cylinder 25 at the connection 42.

A gage 43 is connected in the feed line 35 between the control unit 32 and the air cylinder 25 and includes a pointer 44 operated relative to a dial 45 by the pressure of the air in the feed line. The dial 45 is calibrated in terms of pounds corresponding to the pounds in weight of any one of a plurality of cutters 12 mounted singly or in groups upon the spindle 15. A cut-off valve 48 is mounted in the feed line 35 between the gage 43 and the air cylinder 25 to shut off the air in the feed line should maintenance be required in connection with the air cylinder.

The structure indicated generally at 50 and shown in dotted lines in Fig. 1 includes the conventional air jet 51 receiving air under pressure from the supply line 31 to force the cuttings from the work around the cutter 12.

To condition the pneumatic counterweight to counterbalance the unit 16 and its cutter 12, the operator knowing the weight of the cutter adjusts the screw 39 relative to the plunger 38 of the control valve 32 until the gage 43 registers the weight of the cutter 12 at which time the control mechanism is in readiness for the operation of the machine as long as that particular cutter remains in use in the machine. All that is required of the operator to move the chosen cutter with the unit 16 away from the work is to move the handle 22 upwardly, substantially all of the force acting in the movement of the driving unit 16 with the cutter results from the counterweighing mechanism present in the machine coupled with pneumatic counterweight. As the unit 16 is raised, at the beginning of its movement upwardly the piston in the air cylinder 25 is moved upwardly increasing the space beneath the piston in the cylinder. At this time, the valve or control unit 32 will function to admit more air from the supply line 31 into the feed line 35 and eventually into the air cylinder to maintain the selected pressure beneath the piston, urging it upwardly to counterweight the unit 16. When the unit 16 is moved downwardly, a reverse action takes place in that the air beneath the piston in the air cylinder would be compressed and its pressure increased were it not for the control unit 32. The control unit 32 will exhaust the excess air to the atmosphere through the exhaust portion 36, to maintain the air in the feed line 35, as well as in the air cylinder 25, at the selected constant pressure.

The pneumatic counterweight has been shown and described in only one embodiment, that for which it was originally designed. In this embodiment, it serves as an auxiliary to a known type of counterweighing means which is ineffective to counterweigh any tool or other appreciable mass added to the previously balanced structure. However, if desired, it may be used as the sole counterweighing mechanism of a machine and in either event its use results in an accurate counterweighing of the whole structure to be moved even though its weight is varied over a considerable range.

Although specific improvements of the invention have been shown and described, it will be understood that they are but illustrative and that various modifications may be made therein without departing from the scope and spirit of this invention as defined by the appended claim.

What is claimed is:

A pneumatic counterweight for a vertically slidable unit of a milling machine operated by a mechanism under the control of a manually actuable lever, the unit having milling cutters selectively carried thereby and varying in weight with variations in the number and sizes of the milling cutters carried by the unit, the pneumatic counterweight comprising an air cylinder mounted beneath the unit and having a piston movable therein by air under pressure, a connecting element interposed between the piston and the unit whereby a given force applied to the under side of the piston by air under pressure will be translated to the unit through the connecting element, a supply line for air under a given high pressure, a feed line leading from the supply line to the bottom of the cylinder beneath the piston, a control valve, having an actuable plunger, interposed between the supply line and the feed line, and a member movable to actuate the plunger of the control valve and hold the plunger in any of a plurality of positions to first vary the pressure of the air in the feed line and beneath the piston with variations in the weights of the tools carried by the said operating unit, and then maintain the selected air pressure constant to counterweigh the unit and the selected milling cutter carried thereby to minimize the effort required in manually actuating the lever to move the unit.

MILTON J. MEYLICH.

REFERENCES CITED

The following references are of record in the file of this patent:

UNITED STATES PATENTS

| Number | Name | Date |
|---|---|---|
| 2,133,170 | Johnson | Oct. 11, 1938 |
| 2,201,934 | Turrettini | May 21, 1940 |
| 2,336,478 | Goldberg | Dec. 14, 1943 |
| 2,396,370 | Hartnett et al. | Mar. 12, 1946 |

FOREIGN PATENTS

| Number | Country | Date |
|---|---|---|
| 19,828 | Great Britain | Sept. 6, 1906 |
| 870,234 | France | Dec. 5, 1941 |